(12) United States Patent
Jacobowitz et al.

(10) Patent No.: US 6,793,407 B2
(45) Date of Patent: Sep. 21, 2004

(54) MANUFACTURABLE OPTICAL CONNECTION ASSEMBLIES

(75) Inventors: Lawrence Jacobowitz, Wappingers Falls, NY (US); John U. Knickerbocker, Wappingers Falls, NY (US); Ronald P. Luijten, Horgen (CH); Subhash L. Shinde, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 10/254,955

(22) Filed: Sep. 25, 2002

(65) Prior Publication Data

US 2004/0057677 A1 Mar. 25, 2004

(51) Int. Cl.$^7$ .............. G02B 6/26; G02B 6/42; G02B 6/36; G02B 6/00
(52) U.S. Cl. .............. 385/88; 385/89; 385/93; 385/52; 385/139
(58) Field of Search .............. 385/88–93, 139, 385/14, 49, 52

(56) References Cited

U.S. PATENT DOCUMENTS

| | | | |
|---|---|---|---|
| 3,663,194 A | 5/1972 | Greenstein et al. ............. 65/43 |
| 4,070,516 A | 1/1978 | Kaiser ........................ 428/137 |
| 5,061,027 A | 10/1991 | Richard ........................ 385/14 |
| 5,200,631 A | 4/1993 | Austin et al. ................. 257/570 |
| 5,319,725 A | 6/1994 | Buchmann et al. ........... 385/14 |
| 5,384,873 A | 1/1995 | Chun et al. ................... 385/31 |
| 5,420,954 A | 5/1995 | Swirhun et al. .............. 385/92 |
| 5,428,704 A | 6/1995 | Lebby et al. ................. 385/92 |
| 5,432,630 A | 7/1995 | Lebby et al. ............... 398/116 |
| 5,446,814 A | 8/1995 | Kuo et al. ..................... 385/31 |
| 5,500,540 A | 3/1996 | Jewell et al. ................ 257/82 |
| 5,521,992 A | 5/1996 | Chun et al. ................... 385/14 |
| 5,545,359 A | 8/1996 | Ackley et al. ............ 364/1.24 |
| 5,631,988 A | 5/1997 | Swirhun et al. .............. 385/89 |
| 5,701,374 A | 12/1997 | Makiuchi ..................... 385/49 |
| 5,774,614 A | 6/1998 | Gilliland et al. ............... 385/88 |
| 5,781,682 A | 7/1998 | Cohen et al. .................. 385/89 |
| 6,056,448 A | 5/2000 | Sauter et al. ................. 385/92 |
| 6,137,158 A | 10/2000 | Cohen et al. ................. 257/66 |
| 6,229,712 B1 | 5/2001 | Munoz-Bustamante et al. ........................... 361/783 |
| 6,234,687 B1 | 5/2001 | Hall et al. ..................... 385/88 |
| 6,243,509 B1 | 6/2001 | Chen ............................. 385/14 |
| 6,374,004 B1 * | 4/2002 | Han et al. ...................... 385/14 |
| 6,522,798 B2 * | 2/2003 | Chiappetta et al. ........... 385/14 |
| 6,641,310 B2 * | 11/2003 | Williams ..................... 385/92 |
| 6,676,302 B2 * | 1/2004 | Cheng et al. ................. 385/88 |
| 2002/0018635 A1 | 2/2002 | Hsieh ......................... 385/137 |
| 2002/0067882 A1 | 6/2002 | Guilfoyle ..................... 385/24 |
| 2002/0105699 A1 | 8/2002 | Miracky ...................... 385/14 |
| 2003/0219209 A1 * | 11/2003 | Kunkel et al. ................ 385/52 |

FOREIGN PATENT DOCUMENTS

JP          11-125751          5/1999

OTHER PUBLICATIONS

IBM Technical Disclosure Bulletin—"Means of Implementing a bus using optical waveguides" Nov. 1991, pp 415–417.
IBM Technical Disclosure Bulletin—"Plastic optical subassemblies and their fabrication" Jun. 1997, pp 81–85.
U. S. patent application publication—US 2001/0031117 A1, Oct. 18, 2001, Steinberg.
U. S. patent application publication—US 2001/0036344 A1, Nov. 1, 2001, Steinberg et al.

* cited by examiner

*Primary Examiner*—Brian Healy
*Assistant Examiner*—Kevin S. Wood
(74) *Attorney, Agent, or Firm*—Eric W. Petraske

(57) ABSTRACT

A set of interlocking modules supports and connects a die containing lasers, a set of precision molded lenses and a set of beam switching elements. Another embodiment of the invention is a structure for mounting a logic chip and an optical chip on a chip carrier, with the optical chip being mounted on the side of the carrier facing the system board on which the carrier is mounted, so that radiation travels in a straight path from optical sources on the optical chip into optical transmission guides on the board.

16 Claims, 2 Drawing Sheets

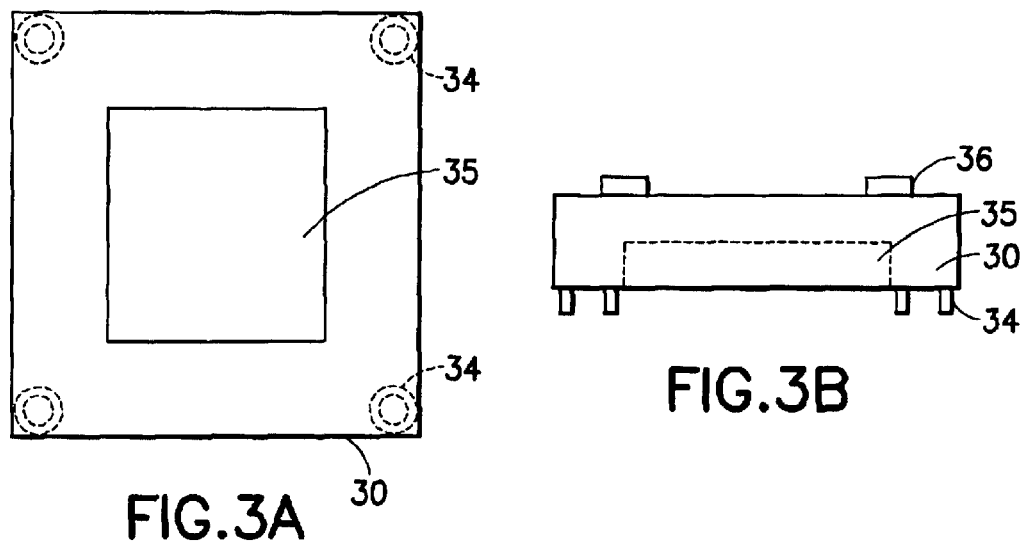
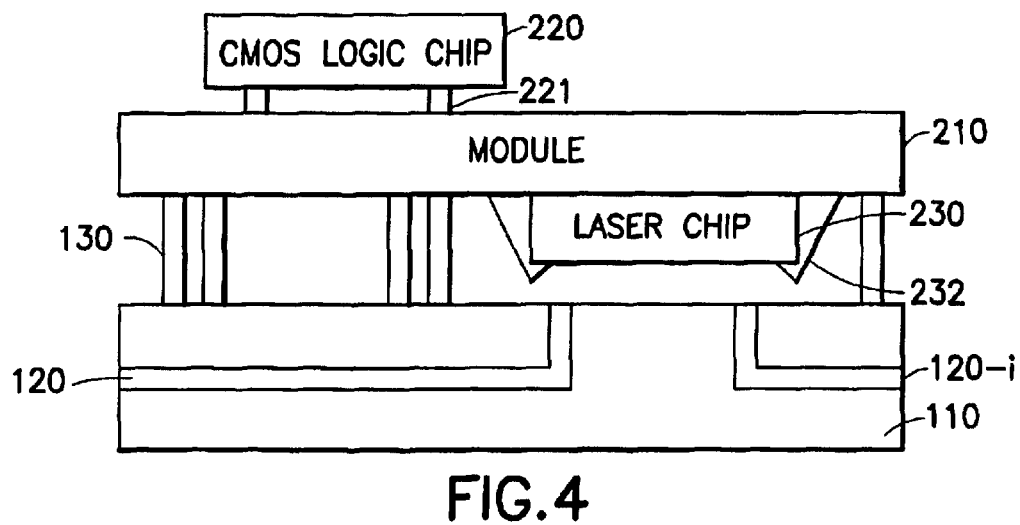

MANUFACTURABLE OPTICAL CONNECTION ASSEMBLIES

TECHNICAL FIELD

The field of the invention is that of assembling optical sources such as VCSEL arrays to substrates containing transmissions links and optical routing members.

BACKGROUND OF THE INVENTION

As high volume digital systems expand their use of optical interconnects, the need for a manufacturable optical connection system increases.

High volume systems typically have a backplane connecting a number of system boards. Such systems contain arrays of optical sources such as VCSELs that generate light that is modulated to carry data and directed to various locations where detectors such as photodiodes convert the modulated optical radiation to electronic signals that can be processed in conventional digital processing systems.

A recurring problem in the field is that of misalignment in optical connector systems. Signal loss that increases the noise level or renders the signal undetectable occurs frequently. Precision alignment systems require expensive setup and constant maintenance.

The art would benefit from passive alignment systems employing self-aligning structures fabricated at low cost with lithographic precision.

SUMMARY OF THE INVENTION

The invention relates to an alignment system for assembling an array of optical sources in alignment with a set of optical transmission members on a system board.

A feature of the invention is the fabrication on the optical chip containing an array of optical sources of passive alignment features.

A feature of the invention is the provision of a simple unit containing an array of lenses in alignment with the array of sources and positioned with alignment members interlocking with the passive alignment features on the optical chip.

Another feature of the invention is the provision of a replaceable optical switching structure fitting into a receptacle matched to the array of lenses, for receiving radiation from the VCSEL array and directing it to various locations on the system board.

Another feature of the invention is a structure for mounting a logic chip and an optical chip on a chip carrier, with the optical chip being mounted on the side of the carrier facing the system board on which the carrier is mounted, so that radiation travels in a straight path from optical sources on the optical chip into optical transmission guides on the board.

BRIEF DESCRIPTION OF THE DRAWINGS

FIGS. 1A through 3B show layers in a first embodiment of the invention in plan and side views.

FIG. 4 shows in partially pictorial, partially schematic form a second embodiment of the invention.

DETAILED DESCRIPTION

Figure 1A:
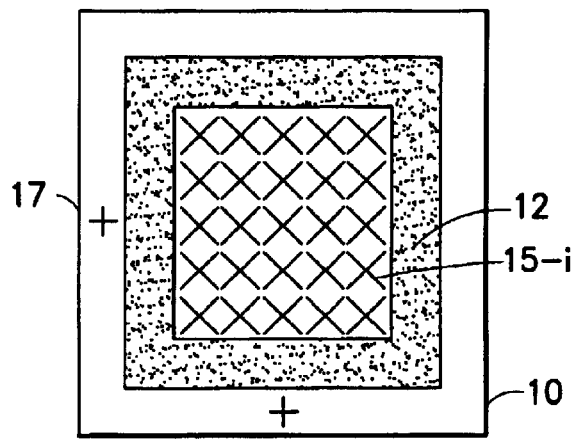
Figure 1B:
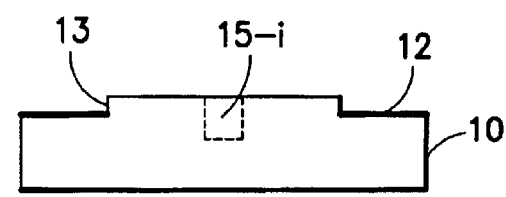

FIGS. 1 to 3 show in plan view and side view a three-layer module that assembles a VCSEL array, a corresponding array of lenses and another corresponding array of optical manipulators that modulate or switch the radiation. In FIGS. 1A and 1B, M×N VCSEL array 15-$i$ on die 10 generates optical radiation. A band 12 surrounding the array is illustratively composed of metallic thin film on which Sn—Pb solder preform can be applied. Fiducial marks 17 are shown as an example. Marks 17 are used to align the die in a precision stage under visual observation. Other marks may be used for self-alignment. This is shown in side view in FIG. 1B. For example, the die 10 is made of GaAs and has conventional VCSELs formed in it. Conventional electrical leads going to the VCSELs are omitted from the drawing for simplicity.

Figure 2A:
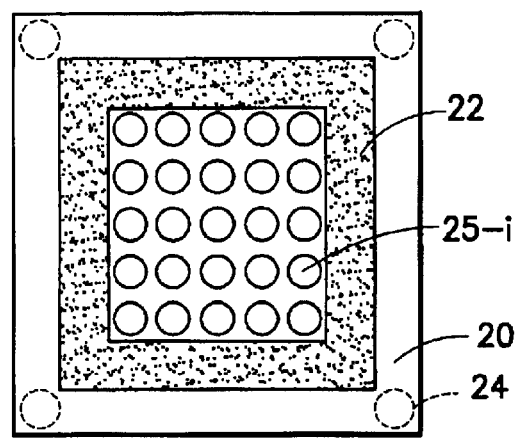
Figure 2B:
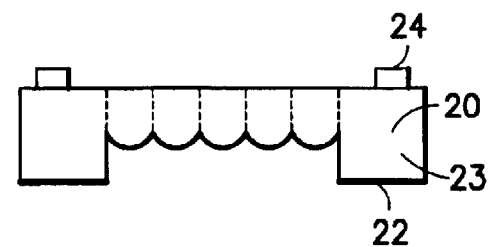

FIGS. 2A and 2B show the next layer is the assembly, referred to generally as an optical transfer unit, in which a lens array 25-$i$, referred to as optical transfer means, is aligned with the VCSEL array. Illustratively the material of optical unit 20 is polymer or glass, transparent to the radiation from the laser array and able to withstand the temperature of 240 degrees C. at which solder 12 is reflowed. It is molded with conventional precision techniques based on a model that is formed by semiconductor lithographic techniques.

For example, the individual lenses in the array may be formed as Fresnel lenses and the projecting rim 23 on the sides in FIG. 2B is etched from silicon as a mold material. With the use of semiconductor etching and forming techniques, definition and placement of the optical lenses can readily be achieved to a tolerance of 10 microns, well within the requirements of the optical system.

Strip 22 in FIG. 2A is also formed of solder electroplated on the bottom of rim 23. On the top surface of module 20 in FIG. 2B, studs 24 (passive alignment structures) are formed by lithographic techniques and then molded. Alternatively, the studs could be etched into the material of module 20 after it is molded, aligned to fiducial marks placed in the mold when it is first made.

Illustratively, alignment between die 10 and module 20 is provided by rim 23 (defining a second dimension) fitting vertical edge 13 of a step that is etched into the top of die 10, thus defining a first dimension. Thus, the outer rim of die 10 is recessed, illustratively 10 $\mu$m, and rim 23 of module 20 surrounds the projecting center of the die, positioning the lenses with respect to the VCSEL array transversely and, since the etching of the step in die 10 and the formation of the rim in the mold for module 20 are done with high mechanical precision, the vertical distance is also set within specifications of about 50 microns. This passive self-alignment system has the advantage that pieces 10 and 20 fit together. Because of the very precise tolerances required in this application and the different coefficients of thermal expansion of the pieces being bonded, assembly is preferably done at an assembly temperature of less than 230 degrees C. so that any stresses between the pieces at room temperature are within acceptable limits.

The focal length of the lenses is set such that radiation is coupled into receiving sections 25 on optical transfer member 35 of FIGS. 3A and 3B. This top unit in the stack has the function of coupling radiation emerging from lenses 25-$i$ into a set of waveguides, Bragg reflectors, mirrors and other optical manipulators in member 35. The function of member 35 is to process the radiation; e.g. to modulate it with a data bitstream. Member 35 is shown schematically as a rectangle in this figure. The radiation is then coupled from member 35 into conventional waveguides, not shown in this figure, in a system board.

Shell 30 in FIG. 3 is pluggable, meaning that it can be inserted and removed by hand, for ready replacement. The individual pieces can be removed so as to provide flexibility in the design. Unit 30 is adapted for interconnection to a fiber array, or a optical routing element etc.

Box 35 can be a passive optical router, such as gratings, lenses etc. It could also have liquid crystal valve arrays in an alternative embodiment, In contrast to the removable nature of connector 30, module 20 is bonded to die 10 by solder reflow. The solder can be remelted, but the design assumption is that this is a one-time bond. Referring again to connector 30, mounting structures 34 mate with corresponding structures 24 on module 20. For example, plugs 24 are circular in cross section (they could alternatively be, e.g. 1 mm square) and mating sockets 34 have circular cavities that fit plugs 24 with a very low tolerance. The assembly, once made, could be kept together by epoxies or solder. The interface between units 20 and 30 is also made at a defined temperature, since the spacing between studs 24 and receptacles 34 will match at only one temperature.

Referring now to FIG. 4, there is shown in cross section another embodiment of the invention in which board 110 represents a printed circuit board in a digital system or any other support for an assemblage of electronic chips. Board 110 contains optical waveguides 120-1 and 120-2, as well as the usual electrical interconnections between chips. At the top of the Figure, chip 220 represents a number of electronic chips that process data, coupling signals and power through a set of contacts 221. Chip 220 is bonded to a ceramic chip carrier 210, or any other packaging unit, that contains electrical interconnects molded into it. On the side of carrier 210 facing toward the system board 120, an optical chip 230, connected electrically by wire bond leads 232, emits radiation into waveguides 120-1 and 120-2. Alternatively, chip 230 could be attached to carrier 210 using the "flip-chip" method of solder balls that provide both electrical and mechanical connection. The radiation transfer could also be two-way, with photodetectors on chip 230 receiving optical radiation from board 110.

Advantageously, the optical chip 230 contains an array of VCSELs similar to that of chip 10 in FIG. 1, with the radiation being directed at a right angle to the plane of the chip. In this embodiment, the radiation passes through an air gap between chip 230 and waveguides 120. Those skilled in the art will be aware that lenses mirrors, etc. as shown in FIG. 1 may be placed between the laser and the waveguide to facilitate coupling.

The direct transmission between source and waveguide in this embodiment facilitates assembly and replacement of the VCSEL array if required. A seal such as reflow 22 in FIG. 1A can be used, if desired.

In both embodiments, the fragility of VCSEL arrays can be addressed by fabricating strengthening members using semiconductor techniques from the "back end" e.g. depositing a layer of material on the back side of the chip and etching it to form strengthening members that resist mechanical stresses that would crack the die.

While the invention has been described in terms of a single preferred embodiment, those skilled in the art will recognize that the invention can be practiced in various versions within the spirit and scope of the following claims.

What is claimed is:

1. An optical assembly structure for the connection of an array of VCSEL dice to a board comprising:
    a VCSEL die containing said array of VCSELs, said array being surrounded by a metallized bonding seam on a top surface thereof;
    a precision optical transfer unit containing a corresponding bonding seam on the bottom thereof corresponding to said metallized bonding seam on said VCSEL die and a first array of passive alignment structures on a top surface thereof, said transfer unit containing optical transfer means for transferring radiation emitted from said array of VCSELs; and
    a pluggable optical connector having an optical transmission unit inserted in a cavity thereof, an array of interlock receptacles on a bottom surface thereof mating with said array of passive alignment structures on said top surface of said optical transfer unit and a second array of passive alignment structures on a top surface thereof for mating with said board.

2. An assembly structure according to claim 1, in which said optical transfer units are lenses that focus radiation emitted by said array of VCSELs on to said optical transfer unit.

3. An assembly structure according to claim 1, in which said array of VCSELs and said optical transfer unit have been bonded together.

4. An assembly structure according to claim 3, in which said array of VCSELs and said optical transfer unit have been bonded together at a bonding temperature such that a first dimension on said VCSEL die matches a corresponding second dimension on said transfer unit.

5. An assembly structure according to claim 4, in which said bonding temperature is less than 230 degrees Centigrade.

6. An assembly structure according to claim 1, in which a module comprising said VCSEL die and said optical transfer unit plugs into said pluggable optical connector, whereby said module may be replaced after manufacture.

7. An assembly structure according to claim 1, in which a module comprising said VCSEL die and said optical transfer unit plugs into said pluggable optical connector, whereby said module may be replaced after manufacture.

8. An assembly structure according to claim 7, in which said optical connector contains a passive optical router adapted for connecting to a set of optical transmission members on said board.

9. An assembly structure according to claim 8, in which said optical transmission members comprise waveguides formed in said board.

10. A method of fabricating an optical assembly structure for the connection of a VCSEL die containing an array of VCSELs to a board comprising the steps of:
    providing a VCSEL die containing said array of VCSELs, said array being surrounded by a metallized bonding seam on a top surface thereof, providing an optical transfer unit containing a corresponding bonding seam on the bottom thereof corresponding to said metallized bonding seam on said VCSEL die and a first array of passive alignment structures on a top surface thereof disposed in alignment with said array of VCSELs, said transfer unit containing optical transfer means for transferring radiation emitted from said array of VCSELs;
    bonding said VCSEL die and said optical transfer unit to form an optical source module; and
    plugging said optical source module into a pluggable optical connector having an optical manipulation unit inserted in a cavity thereof, an array of interlock receptacles on a bottom surface thereof mating with said array of passive alignment structures on said top surface of said optical transfer unit and a second array of passive alignment structures on a top surface thereof for mating with said board, whereby said optical module may be replaced.

11. A method according to claim 10, further comprising a step of testing said array of VCSELs before said step of bonding.

12. A method according to claim 10, further comprising a step of testing said optical module after said step of bonding.

13. A method according to claim 11, further comprising a step of testing said optical manipulation unit prior to plugging said optical module.

14. A method according to claim 10, in which said step of bonding comprises reflow of metal deposited on said bonding seam.

15. An assembly structure according to claim 10, in which said array of VCSELs and said optical transfer unit have been bonded together at a bonding temperature such that a first dimension on said VCSEL die matches a second dimension on said transfer unit.

16. An assembly structure according to claim 15, in which said bonding temperature is less than 230 degrees Centigrade.

* * * * *